United States Patent
Powell

(10) Patent No.: US 7,981,301 B2
(45) Date of Patent: Jul. 19, 2011

(54) METHOD AND APPARATUS FOR TREATMENT OF CONTAMINATED LIQUID

(75) Inventor: Scott W. Powell, Aurora, CO (US)

(73) Assignee: Scott W. Powell, Aurora, CO (US)

( * ) Notice: Subject to any disclaimer, the term of this patent is extended or adjusted under 35 U.S.C. 154(b) by 49 days.

(21) Appl. No.: 12/623,270

(22) Filed: Nov. 20, 2009

(65) Prior Publication Data

US 2010/0140180 A1    Jun. 10, 2010

Related U.S. Application Data

(63) Continuation-in-part of application No. 12/276,078, filed on Nov. 21, 2008.

(51) Int. Cl.
*B01D 33/70* (2006.01)
*B01D 43/00* (2006.01)
*C02F 1/00* (2006.01)

(52) U.S. Cl. .......... 210/748.01; 210/220; 210/243; 210/300; 210/535; 210/540; 210/151

(58) Field of Classification Search .......... 210/151, 210/220, 243, 300, 535, 540, 748.01
See application file for complete search history.

(56) References Cited

U.S. PATENT DOCUMENTS

| | | | |
|---|---|---|---|
| 284,862 A | 9/1883 | Lackersteen | |
| 2,182,145 A | 12/1939 | Eddy | |
| 2,732,944 A * | 1/1956 | Hays | ............... 210/220 |
| 3,340,175 A | 9/1967 | Mehl | |
| 3,788,967 A | 1/1974 | Kawahata et al. | |
| 3,793,173 A | 2/1974 | Kawahata et al. | |
| 3,925,176 A | 12/1975 | Okert | |
| 3,966,567 A | 6/1976 | Pace et al. | |
| 4,036,726 A | 7/1977 | Gale et al. | |
| 4,119,520 A | 10/1978 | Paschakarnis et al. | |
| 4,125,467 A * | 11/1978 | Haddad et al. | ............... 210/800 |
| 4,176,038 A | 11/1979 | Moeglich | |
| 4,293,400 A | 10/1981 | Liggett | |

(Continued)

FOREIGN PATENT DOCUMENTS

AU    80591/82    9/1982

(Continued)

OTHER PUBLICATIONS

U.S. Appl. No. 12/276,078, Powell.

(Continued)

*Primary Examiner* — Chester T Barry
(74) *Attorney, Agent, or Firm* — Sheridan Ross, P.C.

(57) ABSTRACT

An apparatus includes integrated ultra-filtration and clarification, and an optional electrocoagulation capability. The apparatus comprises an outer tank, an inner casing, and a plurality of ultra-filtration filters contained within the inner casing. Clarification of liquid occurs in the gap between the casing and tank. Solid matter settles, and aggregates in the bottom portion of the tank. The accumulated solid material acts as a secondary filter by pre-filtering the liquid prior to contact with the ultra-filtration filters. Clarified liquid is retained in a chamber of the casing, and the clarified liquid is drawn through the ultra-filtration filters as initiated by a source of vacuum communicating with the ultra-filtration filters. Optionally, and upstream electrocoagulation unit and a downstream reverse osmosis unit are provided. Alternatively, the electrocoagulation function is provided by a plurality of reaction plates mounted to the interior sidewall of the tank.

7 Claims, 12 Drawing Sheets

U.S. PATENT DOCUMENTS

| | | | |
|---|---|---|---|
| 4,321,125 A | 3/1982 | Nazarian et al. | |
| 4,329,211 A | 5/1982 | Plantes et al. | |
| 4,450,060 A | 5/1984 | Gonzalez | |
| 4,623,436 A | 11/1986 | Umehara | |
| 4,708,809 A | 11/1987 | Davis | |
| 4,770,755 A | 9/1988 | Valanti et al. | |
| 4,790,923 A | 12/1988 | Stillman | |
| 4,872,959 A | 10/1989 | Herbst et al. | |
| 4,919,775 A | 4/1990 | Ishigaki | |
| 5,013,435 A | 5/1991 | Rider et al. | |
| 5,043,050 A | 8/1991 | Herbst | |
| 5,227,071 A | 7/1993 | Torline et al. | |
| 5,248,424 A * | 9/1993 | Cote et al. | 210/636 |
| 5,302,273 A | 4/1994 | Kemmerer | |
| 5,423,962 A | 6/1995 | Herbst | |
| 5,525,126 A | 6/1996 | Basu et al. | |
| 5,549,812 A | 8/1996 | Witt a.k.a. Witte | |
| 5,571,399 A | 11/1996 | Allen | |
| 5,611,907 A | 3/1997 | Herbst et al. | |
| 5,741,426 A | 4/1998 | McCabe et al. | |
| 5,804,062 A | 9/1998 | Wyness | |
| 5,866,019 A | 2/1999 | Wyness | |
| 5,928,490 A | 7/1999 | Sweeney | |
| 5,928,493 A | 7/1999 | Morkovsky et al. | |
| 5,985,139 A | 11/1999 | Zoeller | |
| 6,139,710 A | 10/2000 | Powell | |
| 6,171,498 B1 | 1/2001 | Fassbender et al. | |
| 6,238,546 B1 | 5/2001 | Knieper et al. | |
| 6,325,916 B1 | 12/2001 | Lambert et al. | |
| 6,346,197 B1 | 2/2002 | Stephenson et al. | |
| 6,358,398 B1 | 3/2002 | Halldorson et al. | |
| 6,406,629 B1 | 6/2002 | Husain et al. | |
| 6,471,869 B1 * | 10/2002 | Yanou et al. | 210/651 |
| 6,488,835 B1 | 12/2002 | Powell | |
| 6,645,385 B2 | 11/2003 | Krulik et al. | |
| 6,689,271 B2 | 2/2004 | Morkovsky et al. | |
| 6,719,894 B2 | 4/2004 | Gavrel et al. | |
| 6,755,970 B1 | 6/2004 | Knappe et al. | |
| 6,855,838 B2 | 2/2005 | Haas et al. | |
| 6,890,451 B2 | 5/2005 | Sapienza et al. | |
| 6,965,044 B1 | 11/2005 | Hammond et al. | |
| 7,008,538 B2 | 3/2006 | Kasparian et al. | |
| 7,211,185 B2 | 5/2007 | Powell | |
| 7,264,732 B2 | 9/2007 | Bradley | |
| 7,297,279 B2 * | 11/2007 | Johnson et al. | 210/669 |
| 7,381,323 B2 * | 6/2008 | Umezawa et al. | 210/108 |
| 7,404,900 B2 | 7/2008 | Bradley | |
| 7,410,584 B2 | 8/2008 | Devine | |
| 7,449,117 B2 * | 11/2008 | Nakayama | 210/650 |
| 2003/0121864 A1 | 7/2003 | Kin et al. | |
| 2004/0188348 A1 | 9/2004 | Yamasaki et al. | |
| 2005/0045534 A1 | 3/2005 | Kin et al. | |
| 2005/0081435 A1 | 4/2005 | Lastella | |
| 2005/0120621 A1 | 6/2005 | Lawson et al. | |
| 2005/0262760 A1 | 12/2005 | Lawson et al. | |
| 2005/0274606 A1 | 12/2005 | Powell | |
| 2006/0080891 A1 | 4/2006 | Ghosh et al. | |
| 2006/0111600 A1 | 5/2006 | Mecham | |
| 2007/0278152 A1 | 12/2007 | Musale | |
| 2008/0202021 A1 | 8/2008 | Powell | |
| 2009/0173638 A1 | 7/2009 | Powell | |

FOREIGN PATENT DOCUMENTS

| | | | |
|---|---|---|---|
| AU | 569026 | | 1/1988 |
| AU | 685260 | | 1/1998 |
| AU | 707432 | | 7/1999 |
| AU | 721834 | | 7/2000 |
| DE | 1526687 | | 2/1970 |
| DE | 2832664 | | 2/1980 |
| EP | 803274 A1 * | | 10/1997 |
| GB | 1526687 | | 9/1978 |
| GB | 2172815 | | 10/1986 |
| GB | 2272171 A * | | 5/1994 |
| JP | 61164695 | | 7/1986 |
| JP | 7-116667 | | 5/1995 |
| WO | WO 94 00860 | | 1/1994 |
| WO | WO 96/17667 | | 6/1996 |
| WO | WO 96/40591 | | 12/1996 |
| WO | WO 98/17589 | | 4/1998 |
| WO | WO 01/53568 | | 7/2001 |
| WO | WO 03/078035 | | 9/2003 |

OTHER PUBLICATIONS

Amended Statement of Grounds and Particulars related to Australian Patent 738707 (related to U.S. Appl. No. 10/050,725), as early as Jul. 14, 2004, pp. 1-11.

Amended Statement of Grounds and particulars related to Australian Patent 738707 (related to U.S. Appl. No. 10/050,725), as early as Dec. 4, 2002, pp. 1-5.

Barkley, et al., "Emerging Technology Summary—Electro-Pure Alternating Current Electrocoagulation", Superfund Innovative Technology Evaluation, Sep. 1993, EPA/640/S-937507, pp. 1-5.

Grigg, AWWA Trade Waste Interest Group and Institute for Sustainable Futures—Joint Seminar, Presentation of Paper, Sep. 14-15, 1999, pp. 1-6.

"Electrocoagulation", Advertisement/Brochure for Cardia Technologies Ltd., as early as 1993, pp. 1-6.

"Clarifiers", Clarifier, Waste Treatment Clarifier, clarifiers, Met-Chem, Inc. web page, as early as Mar. 18, 2007, available at http://www.metchem.com/clarifier.htm, printed on Oct. 21, 2008, pp. 1-2.

Author Unknown, "Electro-Coagulation—Water Treatment Technology", pp. 1-6.

Author Unknown, "Electrocoagulation Systems", pp. 1-9.

Fletcher, et al., "Industrial Electochemistry", Second Edition, Chapman-Hall, 1990, Great Britian, pp. 337-338 and 560-561.

Holt, et al., "Electrocoagulation: A Technology-Oriented Review", Department of Chemical Engineering, University of Sydney, 2006, pp. 1-61.

Horn, "Informational Memorandum for the Deputy Secretary of Agriculture of the U.S. Re: Electrocoagulation," Dec. 11, 1995, pp. 1-4.

"Memcor® Membranes. Quality. Reliability. Experience.", MEMCOR Products—Ultrafiltration and Microfiltration Water and Wastewater Systems, Siemens web page, available at http://water.siemens.com/en/product_lines/memcor_products/Pages/default.aspx?g..., printed on Oct. 20, 2008, p. 1.

Petition related to a request for Invalidation against Korean Patent Application No. 395731 (related to U.S. Appl. No. 10/050,725), 18 pages.

"Reverse Osmosis", Reverse Osmosis—Wikipedia, the free encyclopedia web page, as early as Apr. 4, 2004, available at http://en.wikipedia.org/wiki/Reverse_osmosis, printed on Oct. 22, 2008, pp. 1-6.

"Sewage treatment", Sewage treatment—Wikipedia, the free encyclopedia web page, as early as Jan. 24, 2004, available at http://en.wikipedia.org/wiki/Sewage_treatment, printed on Oct. 22, 2008, pp. 1-10.

Powell, "Electrocoagulation—A Technical Analysis", on behalf of Vortex™ Water Systems, LLC, 1995, pp. 1-25.

Smith, "Applications of New Concepts of Physical-Chemical Wastewater Treatment", Progress in Water Technology, vol. 1, Pergamon Press, edited by W.W. Eckenfelder, et al., paper presented at Vanderbilt University, sponsored by The International Association on Water Pollution Research & The American Institute of Chemical Engineers, Sep. 18-22, 1972, pp. 1-10.

Statement of Grounds and particulars related to Australian Patent 738707 (related to U.S. Appl. No. 10/050,725), as early as Mar. 21, 2002, pp. 1-4.

"Ultrafiltration", Ultrafiltration—Wikipedia, the free encyclopedia web page, available at http://en.wikipedia.org/wiki/Ultrafiltration, printed on Oct. 22, 2008, p. 1.

"Ultrafiltration", ultrafiltration: Definition from Answers.com website, as early as May 26, 2005, available at http://www.answers.com/topic/ultrafiltration, printed on Oct. 20, 2008, p. 1.

Vortex™ Water Systems, LLC., Brochure/Advertisement, pp. 1-6.
"Operating Instructions Manual—Open Chamber Electrocoagulation Demonstration Unit", Vortex™ Water Systems, LLC., pp. 1-14.
"Water purification", Water purification—Wikipedia, the free encyclopedia web page, as early as May 9, 2004, available at http://en.wikipedia.org/wiki/Water_purification, printed on Oct. 22, 2008, pp. 1-5.

Woytowich, et al., "Electrocoagulation (CURE) Treatment of Ship Bilgewater for the U.S. Coast Guard in Alaska," MTS Journal, vol. 27, No. 1, Spring 1993, pp. 62-67.
International Search Report and Written Opinion for International (PCT) Patent Application No. PCT/US09/65475, mailed Jan. 20, 2010.

* cited by examiner

METHOD AND APPARATUS FOR TREATMENT OF CONTAMINATED LIQUID

CROSS REFERENCES

This application is a Continuation-In-Part of pending U.S. patent application Ser. No. 12/276,078, filed Nov. 21, 2008, entitled "METHOD AND APPARATUS FOR TREATMENT OF CONTAMINATED LIQUID" that is incorporated herein by reference in its entirety.

FIELD OF THE INVENTION

The present invention relates generally to systems and methods for treating liquids to remove contaminates such as suspended or dissolved solids. More particularly, the present invention relates to a system and method for treatment of a contaminated liquid in which an integrated clarifier and ultra-filtration apparatus are provided to improve the overall treatment process prior to a final treatment action, such as filtration by reverse osmosis.

BACKGROUND OF THE INVENTION

Wastewater treatment is the process of removing targeted contaminants from a wastewater stream. Wastewater treatment typically involves a series of treatment steps including chemical, biological and physical treatment measures to remove the targeted contaminants. A typical wastewater treatment facility includes a number of physical components that operate in series to remove the targeted contaminants. The treatment components used in a wastewater treatment facility will differ depending upon the targeted contaminants to be removed.

One common step in wastewater treatment includes a sedimentation stage where the wastewater stream is allowed to slowly pass through a large tank, referred to as clarifier or sedimentation tank. The primary purpose of a clarifier is to remove solids that may be found in the wastewater stream, thus producing a homogenous liquid that is capable of being treated biologically and/or chemically in final treatment steps.

One of the final stages in a wastewater treatment facility for treating water that is to be released to the environment, or in a water purification system where drinking water is to be produced, is the use of a reverse osmosis (RO) unit and/or an ultra-filtration unit. Ultra-filtration defines a number of different membrane filtration systems in which hydrostatic pressure forces a liquid against one or more semi-permeable membranes. Suspended solids and solutes are retained in the filter, while water and lower molecular weight solutes are passed through the membranes and are recovered as the desired end product. In some processes, ultra-filtration may be a pre-treatment step for a final treatment step using reverse osmosis. As understood by those skilled in the art, a reverse osmosis process is a separation or filtration method that utilizes hydrostatic pressure to force the stream of liquid through a membrane that retains the solute on one side, and allows the pure solvent to pass on the other side of the membrane. Reverse osmosis may alternatively be defined as a process of forcing a solvent from an area of high solute concentration through a membrane to a region of lower solute concentration by application of a pressure in excess of the osmotic pressure.

One particular limitation in the use of a reverse osmosis unit, as well as ultra-filtration units, is that the membranes will become clogged over time, and some reverse flow is required to cause a loosening of the material collected on the membrane surfaces. This reverse flow or backwash requires a temporary shut-down of the waste treatment process. The backwash requirement slows the processing capability of the treatment system.

An ultra-filtration unit typically includes a plurality of separate filter elements that are placed within a tank, and a flow of liquid is provided to the tank in which water is drawn through the filters thereby creating a filtered stream of liquid. Upstream of the ultra-filtration unit may be one or more additional treatment units, such as a clarifier that removes a certain percentage of solids from the liquid stream prior to reaching the ultra-filtration unit. Because the liquid stream is typically carried by a pipe, the remaining solids within the liquid stream reaching the tank holding the ultra-filtration filters is well mixed due to the natural mixing action that occurs within a pipe that may travel a considerable distance and have multiple bends or turns. Therefore, the loading on the ultra-filtration filters comprises most if not all of the solid material that is carried in the liquid stream at that stage.

As a backwash operation is conducted, solid material is loosened from the surfaces of the membranes, and the tank holding the ultra-filtration filters must be drained/cleaned to remove the solids that collect on the bottom surface of the tank. This cleaning requirement further delays the operation of the waste treatment facility.

Therefore, there is a need to provide a waste treatment system and method in which solids introduced to an ultra-filtration unit are minimized to thereby increase the overall efficiency of the ultra-filtration units, which in turn, will reduce the frequency of required backwash and will therefore increase overall system efficiency.

Additionally, there is also a need to reduce the amount of equipment required to accommodate an ultra-filtration unit that not only minimizes the amount of materials used, but also the required space for ultra-filtration.

There is also a need to provide an ultra-filtration unit that minimizes operational and maintenance cost for backwashing the filtration system, yet still provides easy access to the working components of the filtration system.

SUMMARY OF THE INVENTION

In accordance with the present invention, a method and apparatus for treatment of contaminated liquids is provided in which a combined ultra-filtration and clarifier apparatus is used as a pre-treatment step for passage of the liquid stream to final treatment step, such as reverse osmosis filtering. In another aspect of the present invention, another combined apparatus is provided that integrates that ultra-filtration and clarification, as well as an electrocoagulation function.

In yet another aspect of the present invention, a system and method are provided for water treatment in which the combined ultra-filtration and clarifier apparatus is used within a series of treatment stations to include an upstream electrocoagulation unit and a downstream RO unit. If the apparatus has the integral electrocoagulation function, then the upstream electrocoagulation unit is not necessary. The present invention is particularly adapted for water purification as well as wastewater treatment.

In accordance with the apparatus of the invention, an outer tank wall defines an area that receives a flow of the liquid stream from an upstream treatment source, such as an electrocoagulation unit. The tank wall has an upper portion that may be cylindrical or rectangular, and a lower conical portion having a reduced area as compared to the upper portion. Disposed within the tank wall and spaced from the tank wall is an interior wall or casing that resides within the upper portion of the tank. The casing has an open top and an open bottom. The liquid stream enters the upper portion of the tank, and the liquid is received in the annular gap or space between the tank wall and casing. Solids within the liquid stream will settle or precipitate out and then fall into the lower conical portion of the tank. The solids or sludge build up within the lower portion of the tank over time.

A plurality of ultra-filtration filters is disposed within the casing, and the filters are supported within the casing by one or more supporting members. The ultra-filtration filters are submersed within the liquid within the tank. The lower ends of the filters extend to a level that is adjacent to a lower end of the casing. The upper ends of the filters communicate with a source of vacuum such that liquid in the chamber, defined as the space within the casing, is drawn through the filters and transported downstream.

Because the liquid is continually passed through the filters, a circulation is achieved in the tank whereby liquid in the annular gap or space is forced to travel around the lower end of the casing and into the chamber within the casing. Preferably, the casing as well as the lower ends of the filters is placed just above the level of the sludge/solids that have built up within the lower portion of the tank. The solid material that builds up within the tank is commonly referred to as a sludge blanket. Therefore, liquid flow through the tank also requires that the liquid flow through at least some portion of the sludge blanket before it reaches the chamber within the casing. The general flow pattern established within the apparatus can be summarized as first a downward flow in the annular gap or space, then into and across the sludge blanket, and finally upward into the chamber within the casing prior to evacuation through the filters.

This combined apparatus may also include an electrocoagulation function by incorporating a plurality of reaction blades or plates that are secured on one interior side of the tank, preferably the side of the tank that receives the flow of liquid. The liquid flows down between the plates where the liquid can be treated by electrocoagulation in which an electrical field is created between the plates and the contaminates coagulate with ions released from the breakdown of the plates. The contaminates then settle to the bottom of the tank where they contribute to the sludge formation.

The integrated or combined apparatus has many advantages. First, the settling capability of the outer tank as a clarifier/sedimentation tank minimizes the amount of solid particulates that can reach the ultra-filtration units, thereby extending the period of operation of the ultra-filtration units before backwash is required. Additionally, the apparatus of the invention requires only one tank for clarifying and filtering, thus eliminating the need for two separate tanks. In the event the apparatus includes the electrocoagulation function, the apparatus replaces the need for three separate tanks. A clarified liquid is retained within the chamber of the casing and the clarified liquid therein is isolated and not subject to any turbulent flow that could otherwise re-suspend solids in the clarified liquid. Further, the requirement of the liquid flow through the sludge blanket further enhances separation of the solids from the flow of the liquid, since the sludge blanket itself acts as a pre-filter prior to the liquid reaching the filters. Thus, the sludge blanket can be viewed as a secondary filter to capture additional suspended solids. This secondary filtering feature of the apparatus can be selectively controlled by the amount of vacuum that is pulled on the filter units, thereby also providing the capability to adjust ultra-filtration at rates consistent with the capabilities of the installed type of ultra-filtration filters.

One or more control elements may be used to maintain the sludge blanket at a desired height within the tank that requires the liquid to flow through at least some portion of the solid mass prior to reaching the chamber within the casing. For example, one or more photo-eye switches can be installed within the tank that provides a measurement capability for determining when the sludge needs to be removed from the tank. The lower conical portion of the outer tank incorporates a drain that allows a user to remove a desired amount of solid mass. The switches can electrically control a drain valve in the drain for selective removal of solids within the tank.

Additionally, it may be desirable to adjust the density of the sludge blanket within the tank to better facilitate a desired flow of liquid through the solid mass. Accordingly, it is also contemplated that one or more vibrators can be attached to the outer surface of the lower portion of the tank. The vibrators will increase the density of the sludge blanket causing the solid material to occupy less space within the lower portion of the tank. It is also contemplated that an auger or stirring assembly can be used to slowly stir the solid mass in order to adjust the density of the solid mass to thereby optimize a flow of liquid through the sludge blanket prior to reaching the chamber of the casing. Stirring is done at a rate however that does not materially increase the amount of suspended solids in the chamber. During this stirring, the vacuum drawn on the filters can be shut off to allow any re-suspended solids to re-settle back to the sludge blanket.

Depending upon the type of ultra-filtration filters provided, a source of air may be introduced into the tank and to the ultra-filtration filters to maximize operation of the filters and/or to provide additional cleaning capability at which point in time the filters require a backwash cycle.

In another aspect of the method and system of the present invention, another embodiment is provided to increase the percentage of liquids recovered to prevent the necessity of adding yet another downstream treatment step, such as the use of evaporation ponds. In some industrial processes, because of the type of contaminates that are being removed, environmental regulations may dictate that the recovered solids have very small amounts of liquid. The prior art solution in many industrial water treatment processes for removing the final percentages of water found in the solids is to transport the solids/slurry to evaporation ponds where the water is removed by evaporation. However, this is an extremely expensive solution for many industrial processes since evaporation ponds require a significant amount of land, labor and materials. Further, evaporation is very slow in many climates which limit the rates at which the solid wastes can ultimately be removed to a landfill. Therefore, "zero liquid discharge" regulations create a limiting design constraint for many wastewater treatment systems. In order to solve this problem, the system and method of the present invention provides an additional treatment step in which the reject water from the ultra-filtration/clarifier device is further processed in a downstream filter press which removes a significant portion of remaining liquid, and additionally a downstream clarifier under vacuum is provided to convey the recovered liquid to the upstream treatment system for further treatment.

In another embodiment of the present invention, an integrated ultra-filtration and clarifier system are provided in which a pair of treatment systems are combined in a linear, side-by-side fashion which provides a number of benefits to include space savings, increased cleaning and maintenance efficiencies, and an efficient system layout that minimizes required pipe runs. In this embodiment, a pair of integrated ultra-filtration and clarifier tanks is provided, along with a corresponding pair of electrocoagulation devices that provide upstream electrocoagulation treatment of the liquid delivered to the integrated dual-purpose tanks.

These and other features and advantages of the present invention will become apparent from a review of the following detailed description, taken in conjunction with the drawings.

DETAILED DESCRIPTION

Figure 1:
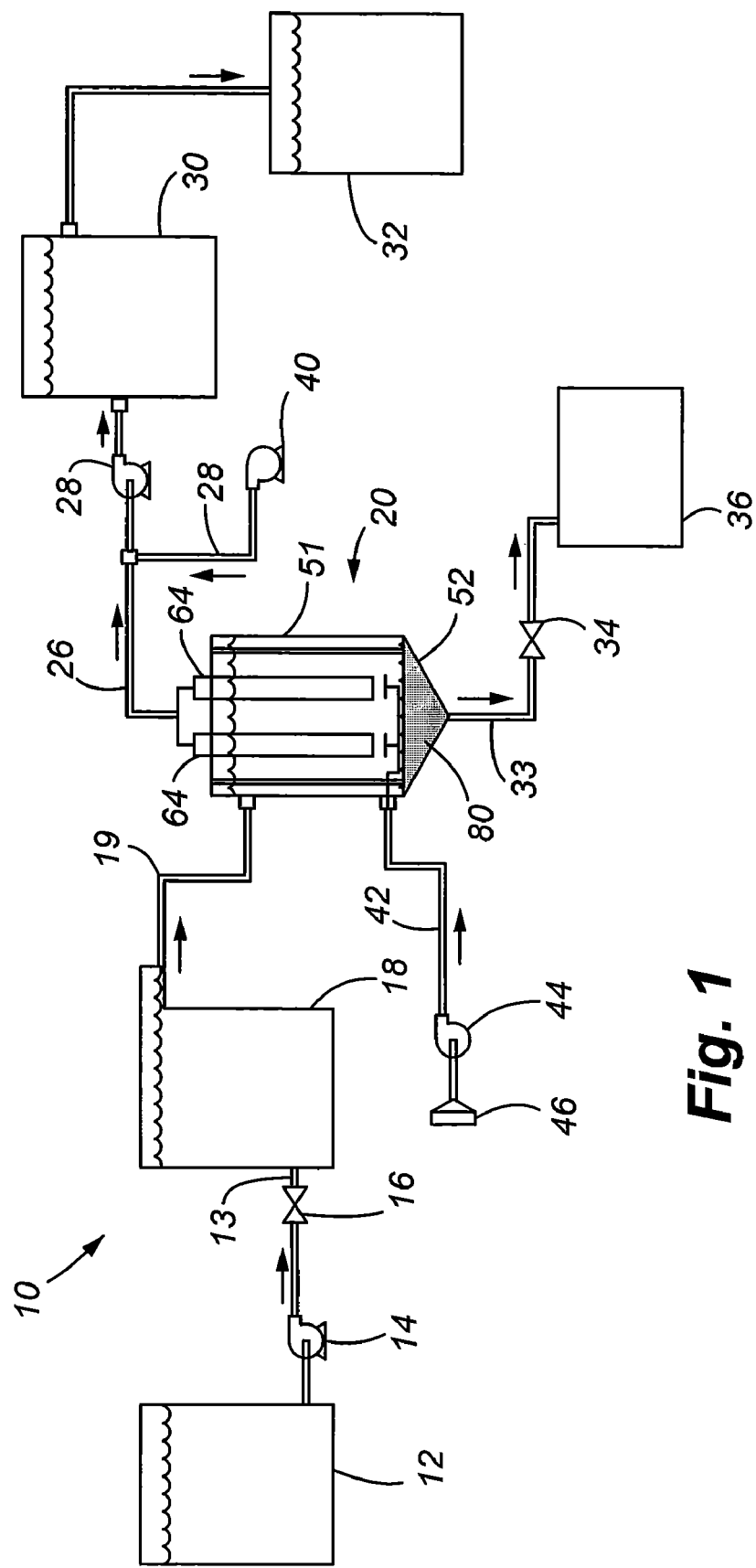
FIG. 1 is a schematic view of the method and system of the present invention that incorporates an integrated ultra-filtration and clarifier capability.

Referring to FIG. 1, a system 10 in accordance with the present invention is illustrated comprising a number of components that are used to provide treatment for the liquid, which may include water, or other liquids that are used in industrial and commercial purposes. The system 10 can be incorporated into yet a larger treatment system designed to specifically treat for removal of targeted contaminants. Thus, it shall be understood that the system 10 of the present invention can either be a stand-alone system, or can be incorporated within yet a larger treatment system.

FIG. 1 more specifically illustrates a first holding tank/reservoir 12 that provides the contaminated liquid to be treated. The liquid is conveyed to an electrocoagulation unit 18 by a pump 14 in which a control valve 16 regulates the flow of liquid through the conveying line 13. The electrocoagulation unit 18 may be conventional, such as the ones illustrated in the U.S. Pat. No. 7,211,185 entitled "METHOD AND APPARATUS FOR ELECTROCOAGULATION OF LIQUIDS", this patent being hereby incorporated by reference in its entirety.

The electrocoagulation unit 18 provides a first treatment step whereby solids or flock are generated and contaminants are bound to the solid particles. The treated liquid from the electrocoagulation unit 18 is transferred by line 19 to the integrated ultra-filtration and clarifier apparatus 20. An intermediate pump (not shown) can be used to convey the liquid from the electrocoagulation unit 18 to the integrated apparatus 20. The particular structural details of the integrated apparatus 20 are discussed in greater detail below with respect to FIG. 2.

Treated liquid from the integrated apparatus 20 is evacuated through line 26, as aided by vacuum pump 28 which then conveys the treated liquid to a downstream treatment unit, such as a reverse osmosis unit 30. Once the reverse osmosis operation has been conducted, the result is a treated liquid that can be stored or transferred from a treated liquid container 32 that holds the treated liquid from the reverse osmosis unit. Sludge/solids can be removed from the integrated apparatus 20 through drain line 33 as controlled by drain valve 34. The sludge/solid can be further treated in another treatment step, such as use of a clarifier or filter press 36.

Depending upon the type of ultra-filtration filters used, a source of air can be provided to the filters as by air line 42 in which air is forced into the integrated apparatus 20 as by blower 44 which draws air through at least one filter 46.

FIG. 1 also shows a blow back pump 40 that provides a backwash of liquid and/or air into the filter elements in order to remove solids that adhere to the membrane surfaces. Blow back pump 40 can provide a flow of liquid, air or a combination of both back through the filters as specified by a user.

Figure 2:
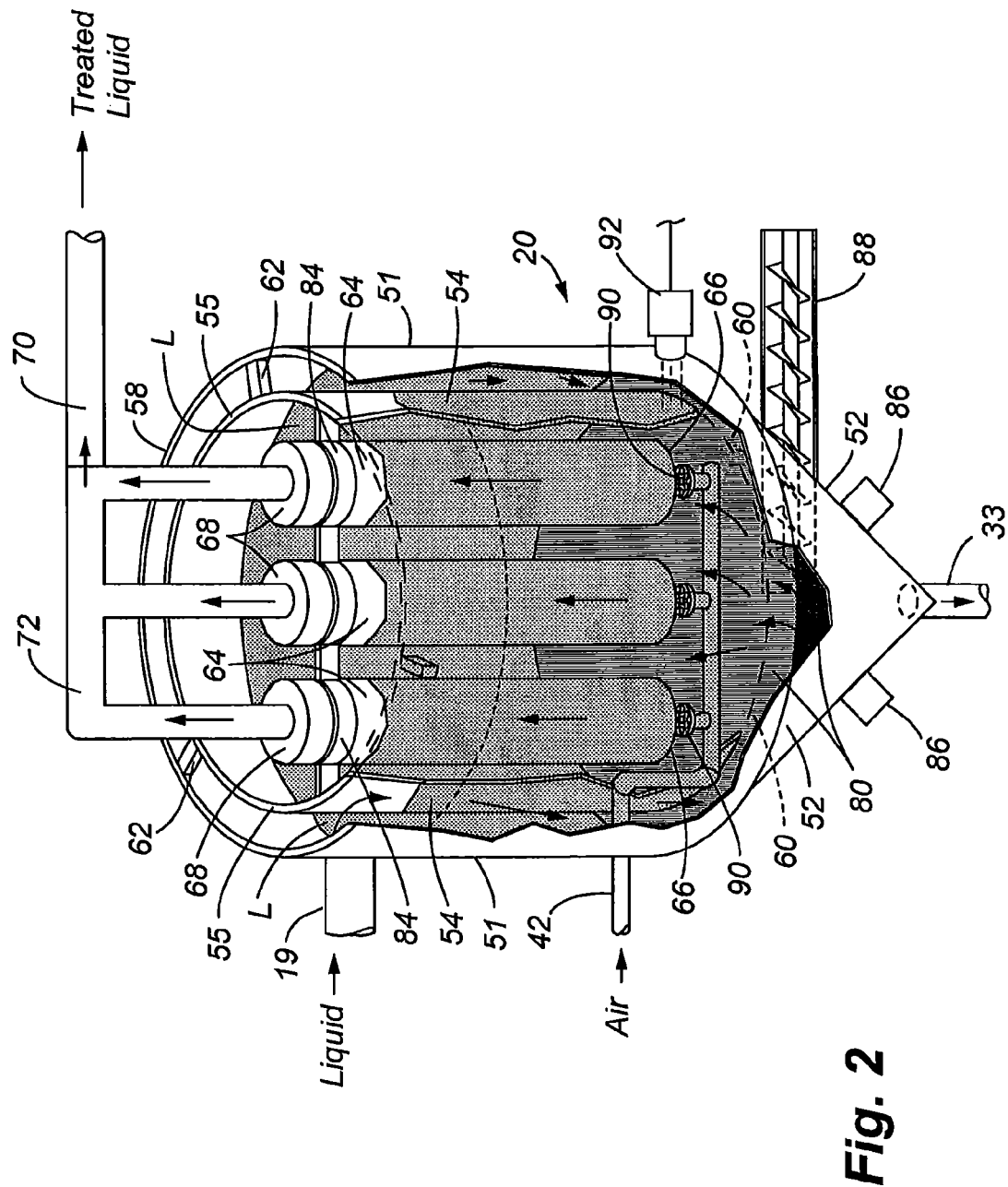
FIG. 2 is an enlarged partial fragmentary perspective view of the integrated ultra-filtration and clarifier apparatus in accordance with a preferred embodiment of the present invention.

Referring to FIG. 2, the combined or integrated apparatus 20 is illustrated. The integrated apparatus 20 is characterized by an outer tank having a cylindrical upper portion 51, and a lower conical portion 52 that extends below the upper portion 51. The upper portion 51 of the tank has a greater area than the lower conical portion 52. The lower conical portion is arranged such that the narrower end of the lower conical portion connects to the drain line 33.

Disposed within the tank and spaced from the interior tank wall is an interior cylinder or casing 54. The interior casing 54 is supported within the tank as by a plurality of support trusses 62 that interconnect the casing 54 to the wall of the tank. The casing 54 has an upper edge 55 that may be positioned just below or at the same level as the upper edge 58 of the tank. The casing has a lower edge 60 that extends deep into the tank, and can be located at or near the transition between the cylindrical upper portion 51 of the tank and the lower conical portion 52. The liquid L enters the tank through the line 19 and into the gap or space between the tank and the casing 54.

Disposed within the casing 54 is a plurality of ultra-filtration filters 64. The filters more specifically lie within a chamber or open space defined within the interior of the casing 54. The ultra-filtration filters 64 are suspended within the casing 54 as by a plurality of mounting brackets/trusses 84 that stabilize the ultra-filtration filters at designated locations within the chamber of the casing 54. The filters 64 have upper ends 68 that can be disposed at or near the level of the upper edge 55 of the casing, and the lower ends of the filters 66 may be disposed slightly above the lower edge 60 of the casing. Accordingly, the filters extend substantially along the height of the casing 54.

It is also contemplated that the mounting brackets/trusses 84 can be alternatively mounted to the tank in which the entire mounting bracket/truss structure can be removably lowered and raised so that the filters can be inspected and replaced as necessary. Accordingly, the brackets/trusses 84 could include opposing end flanges (not shown) that rest on opposite sides of the upper edge 58 of the tank with the brackets/trusses extending between the flanges for supporting the filters. The bracket/truss structure 84 could therefore be easily lifted for inspection and replacement of the filters. The brackets 84 can also be in the form of a cable arrangement that supports the separate filters and spans between and connects to the opposing upper edges 58 of the tank wherein the cable is easily lifted or lowered to access the filters 64.

A vacuum manifold 72 is attached to each of the filters 64, and the vacuum manifold in turn communicates with a transfer or outlet line 70 that connects to a source of vacuum (pump 28), to pull the liquid within the chamber upwards and through the filters 64.

Disposed within the lower conical portion 52 of the tank is the sludge blanket 80. The sludge blanket is created as a result of continued operation of the integrated apparatus in which solid matter from the electrocoagulation unit collects within the lower portion of the tank. For optimum operation of the integrated apparatus, it is preferable to maintain a level of the sludge such that a majority of the liquid that enters the tank has to travel through the sludge blanket 80, thereby resulting in secondary filtration of the liquid stream as it passes through the sludge blanket. A preferred location for the upper surface or edge of the sludge is just below the lower edges 66 of the filters 64. This location of the sludge blanket thereby requires the liquid to pass through a significant portion of the solid mass of the sludge blanket prior to reaching the chamber of the casing. The lower end 60 of the casing 54 may be in contact with the sludge blanket depending upon the location of the lower ends of the filters. The liquid that finally enters the chamber is highly clarified thereby minimizing the loading on the filters. The clarified liquid in the chamber is maintained in a turbulent free environment since the casing wall in combination with the sludge blanket prevent direct propagation of turbulent flow that may be occurring in the gap or space between the tank and the casing as liquid is introduced in the tank. The turbulent free environment within the chamber maintains the secondary filtration effect of passing the liquid through the sludge blanket in which turbulent flow might otherwise re-suspend a certain portion of the solid matter into the liquid stream. As mentioned, the minimization of solid particles within the liquid stream reduces the overall load placed on the ultra-filtration filters, thereby increasing the performance of the filters, and reducing down time required to conduct a back wash cycle in order to clean the filters. The level of the liquid L within the gap between the tank and the casing and the level of the liquid L within the casing 54 may vary depending upon the rate at which the liquid enters the tank, the rate at which the liquid is evacuated through the filters, and the rate at which the liquid is filtered through the sludge blanket.

As also shown in FIG. 2, a source of air can be provided through air line 42 along with a plurality of air nozzles 90 that provide a flow of air along with the clarified liquid through the filters. Depending upon the type of ultra-filtration filters used, some of the filters perform better when a stream of air is also introduced simultaneously with the liquid.

One type of ultra-filtration filter that may be used in the present invention is a Trisep® spiral wound membrane filters. Another example of an ultra-filtration filter that can be used includes Memcor® membrane filters.

The flow rate of filtered liquid through the line 70 can be determined by the vacuum pulled by the source of vacuum. In order to create the desired filtration effect of the sludge blanket 80, it is also contemplated that the density of the particles within the sludge blanket can be adjusted. Accordingly, a stirring assembly or auger 88 can be used to slowly stir the solid material to prevent clumping of the solid material that could overly inhibit liquid flow through the sludge blanket. The use of the stir assembly 88 would ensure a very slow and uniform stirring of the solid mass, and would not re-suspend an appreciable amount of solids which otherwise could occur if the solid mass was agitated with too much speed/force. In order to increase the density of the solid mass, it is also contemplated that one or more vibrators 86 can be placed in contact with the tank wall. The vibrations produced by the vibrators result in further downward movement and compaction of the solid mass into the conical portion 52. The vibrators 86 can also assist in evacuation of the solids through drain line 33 at which point in time the solid mass builds to a level that approaches contact with the lower ends 66 of the filters 64.

In order to determine when to evacuate some of the solid mass, one or more photo-eye switches 92 can be used to observe and signal the point in time when a portion of the solid mass should be removed. The activation of the photo-eye switch(es) can be used to open and close the drain valve 34 in the drain line 33.

Figure 3:
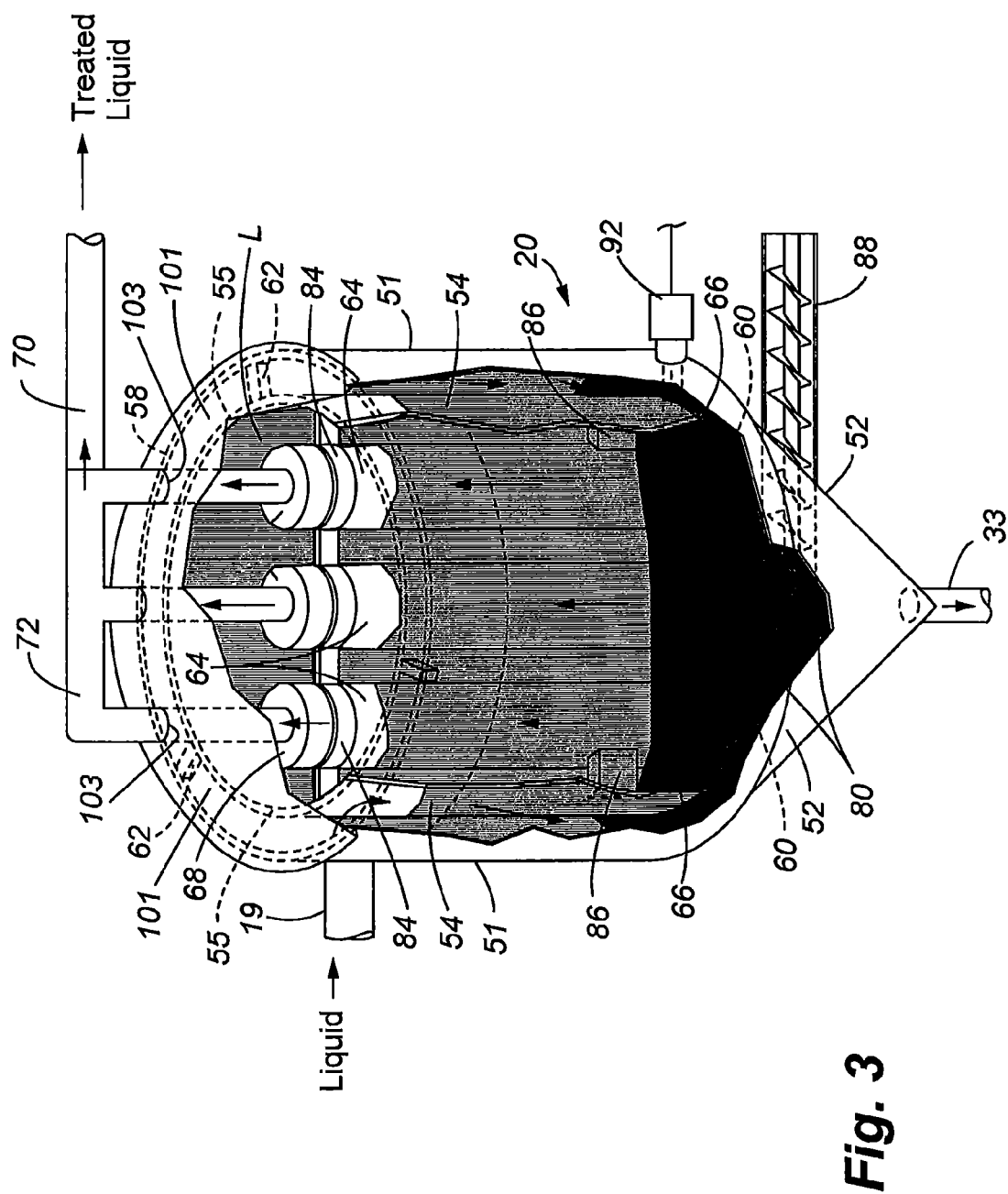
FIG. 3 is an enlarged partial fragmentary perspective view of the integrated ultra-filtration and clarifier apparatus in accordance with another preferred embodiment of the present invention.

FIG. 3 illustrates an integrated apparatus 20 in another preferred embodiment of the present invention. The same reference number used in this embodiment corresponds to the same structure elements referred to in the embodiment of FIG. 2. The embodiment of FIG. 3 differs from the embodiment of FIG. 2 in that the embodiment of FIG. 3 includes a cover or top 101 that is used to isolate the liquid within the tank. The cover 101 is removable in order that an operator may obtain access to the ultra-filtration filters 64 and other components within the apparatus. A plurality of openings 103 may be formed in the cover 100 to accommodate the vacuum manifold 72 and the connecting lines extending from the respective filters 64. The cover 101 is especially useful for liquid treatment operations that may take place on a ship, where listing of the ship might otherwise cause liquid to spill from the apparatus. FIG. 3 also shows a different location for the vibrators 86. In this embodiment, the vibrators 86 are disposed within the chamber and are secured to the casing 54. In this arrangement, the vibrators 86 are also used to assist in cleaning of the filters 64. In FIG. 3, the sludge blanket is raised, and covers the lower ends 66 of the filter 64. The vibrators create a wave action in the liquid within the chamber that helps to clean the filters. Specifically, the vibrations cause a series of waves that propagate through the chamber that dislodge solids adhering to the filters. The vibrators in this embodiment can be placed above the level of the sludge blanket or in the sludge blanket. Since the filters are made from a solid material, the membranes of the filters remain relatively stationary as compared to the wave action created from the vibrators, thus enhancing the cleaning effect on the membranes of the filters. The vibrators can be energized at low levels during operation of the apparatus in which smaller waves provide a continual cleaning effect but do no result in re-suspension of solids. During a backwash cycle, the vibrators can be energized to create larger waves for a more robust cleaning action. In the embodiment of FIG. 3, it is noted that the sludge material in contact with the filters does not materially inhibit the functioning of the filters, assuming that the capacity of the vacuum source is great enough so that liquid can still be pulled through the filters.

It is also contemplated in the present invention that biological agents can be added in order to further treat the liquid. A desired biological microbe group can be selected to treat various organic containments, and therefore supplements the other treatment aspects of the present invention. The microorganisms introduced can operate a number of ways to include both aerobic and anaerobic digestion of containments. With respect to aerobic digestion, the air introduced through air line 42 can also be used to supply the needed oxygen to enhance the aerobic digestion.

It is also noted in FIG. 3 that the air line 42 and air nozzles 90 have been eliminated for clarity, it being understood that the air line and nozzles can also be incorporated within the embodiment of FIG. 3.

In accordance with the method of the present invention, a particular flow of the liquid is created through the integrated apparatus, which results in creation of maximized clarified liquid prior to the liquid reaching the ultra-filtration filters. In accordance with the method, a flow of liquid is provided through the upper portion of the tank. The liquid initially resides within the gap or annular space between the tank and casing. The solid particulate matter settles out of the liquid, leaving a solid mass or sludge blanket within the lower portion of the tank. The liquid level within the tank can be varied, but is typically full in order to maximize the amount of liquid treated.

A flow of liquid is caused to pass through the sludge blanket by a source of a vacuum that pulls the liquid into the sludge blanket and upwards into the chamber and through the ultra-filtration filters. Some amount of clarified liquid remains within the chamber. There is very little if any turbulence within the chamber, thereby ensuring that there is minimal re-suspension/mixing of the clarified liquid, which therefore minimizes loading on the filters. The filtered liquid is then transferred downstream for further treatment and/or storage.

Figure 4:
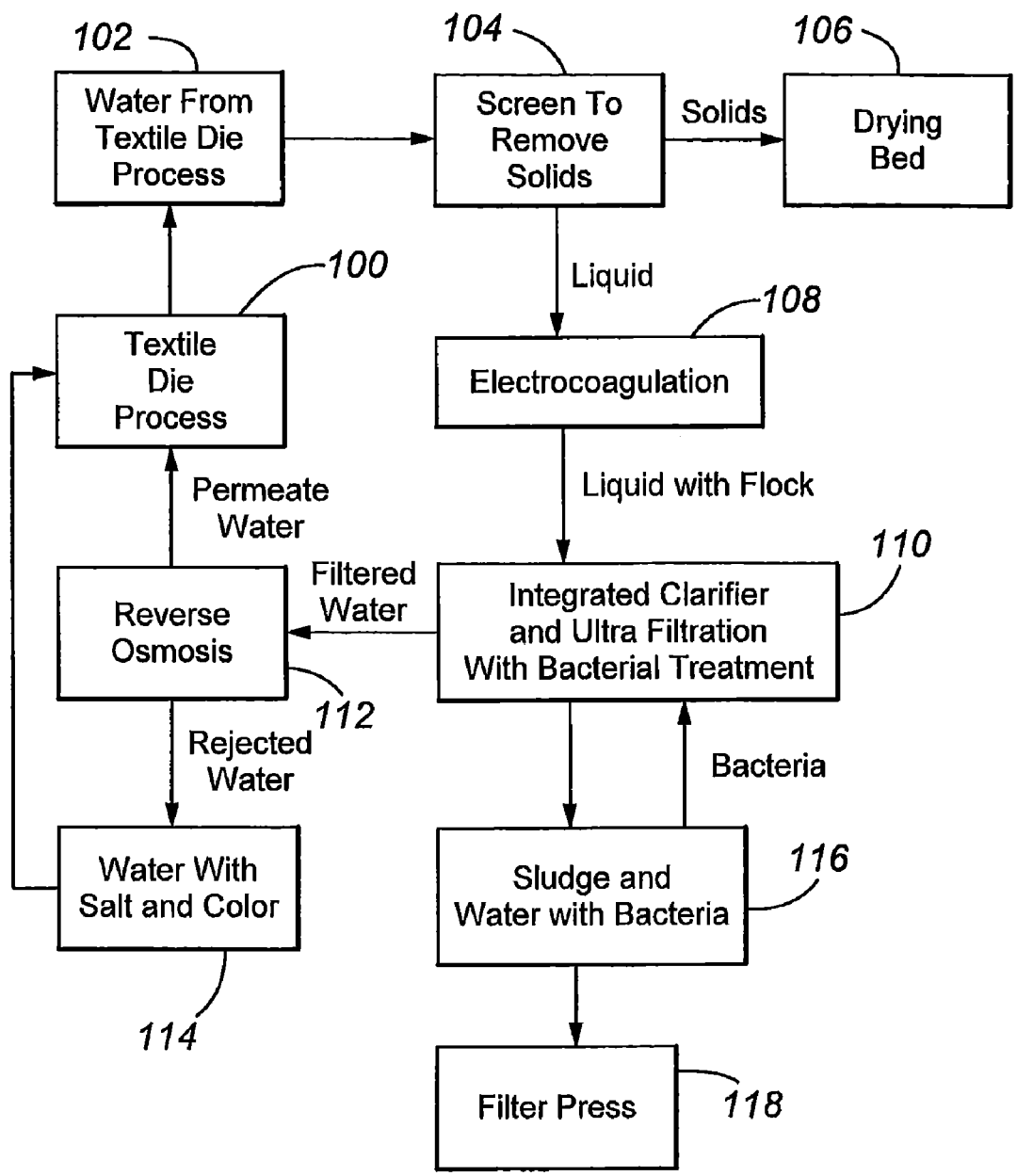
FIG. 4 is a flowchart illustrating a method of the present invention with respect to a process of treating liquid from a textile die system.

FIG. 4 illustrates another embodiment of the present invention with respect to a method of treatment of water used in a particular industrial process, namely, water used in a textile die system. As shown in the flow diagram of FIG. 4, a textile die machine at block 100 produces contaminated water that contains various contaminates to include colored die having various chemical constituents. At block 102, water from the textile die machine can be introduced to a screen at block 104 to remove solids in the water stream. At block 106, the solids are transferred to a drying bed where the solids can be used, for example, as fuel in the textile die process, or can be disposed of in a landfill. At block 108, the liquid undergoes electrocoagulation where contaminants adhere to the ionized solids produced during electrocoagulation. At block 110, the liquid with the solid particles/flock from the electrocoagulation are treated in the integrated clarifier and ultra-filtration apparatus of the present invention. Additionally, the integrated apparatus may include bacterial treatment in which a selected group of micro-organisms are introduced into the tank. At block 112, the filtered water from the integrated apparatus then undergoes a reverse osmosis treatment. The treated permeate water from the reverse osmosis step can then be returned to the textile die machine as fresh water. For the rejected water from the reverse osmosis process, this rejected water at block 114 includes water with salt, and this rejected water can also be reused in the textile die process. For example, salt laden water is often used to increase osmotic pressure causing the die to more completely enter the fabric during the dyeing process. At block 116, the sludge and water laden bacteria is removed from the integrated apparatus. The bacteria can be returned to the integrated apparatus, while the solids are then subject to a filter press operation at block 118. A selected return of bacteria to the integrated apparatus is done to optimize and maintain the desired micro-organism levels in the integrated apparatus. A constant requirement to add new bacteria would otherwise add costs to the treatment method. The solids from the filter press can then be taken to a landfill for disposal. Thus, FIG. 4 illustrates an industrial process that can be greatly enhanced by incorporation of the integrated clarifier and ultra-filtration apparatus of the present invention.

Figure 5:
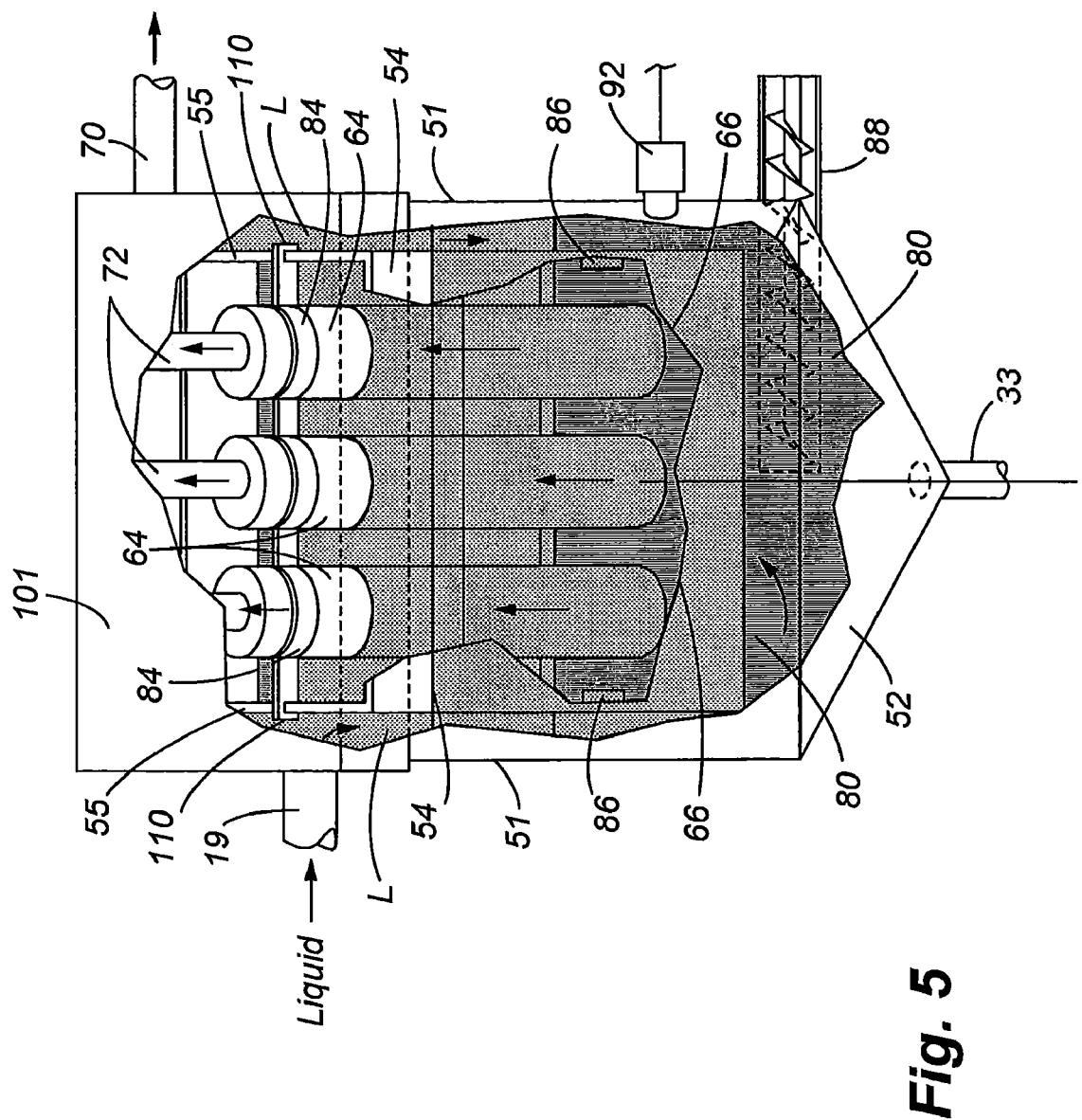
FIG. 5 is an enlarged fragmentary perspective view of the integrated apparatus in another embodiment in which the tank and the casing have a rectangular shape.

FIG. 5 illustrates another embodiment of the apparatus of the present invention in which the tank and the chamber are rectangular shaped. Like numbers in this embodiment correspond to the same structural features in the prior embodiment. The lower portion 52 can have four converging sides in lieu of a conical shape. This embodiment also illustrates bracket mounts 110 that allow the brackets 84 to removably mount over the upper edge 55 of the chamber. These bracket mounts 110 are slots that are formed in the brackets 84 and allow the filters 64 to be lifted together from or lowered onto the upper edge 55 during maintenance or repair. The cover 101 can be removed when the filters are to be replaced or repaired. FIG. 5 also shows that the manifold is housed within the cover 101, and a single side opening is made in the cover to allow passage of the vacuum line 70.

Figure 6:
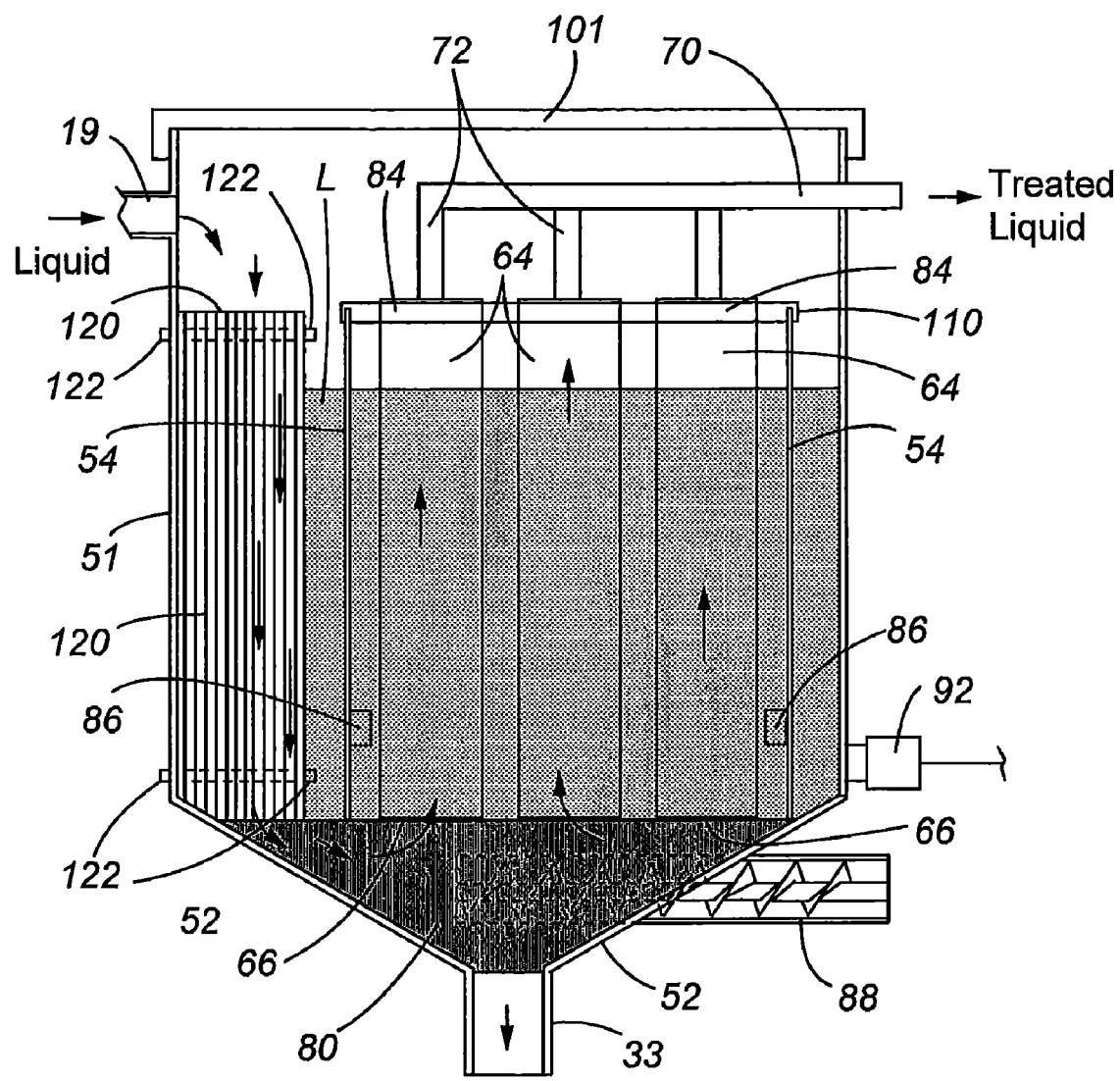
FIG. 6 is a cross-sectional view illustrating another embodiment of the apparatus in which an electrocoagulation function is added by incorporating plurality of reaction plates or blades within the tank in the gap or space between the tank and the casing.

FIG. 6 illustrates yet another embodiment of the present invention that adds the electrocoagulation function by incorporating a plurality of reaction plates 120 that are mounted to a side of the tank as by mounting rods 122. Preferably, the plates 120 are positioned on the side of the tank where the liquid is introduced through line 19. As shown, the liquid is allowed to flow downward between the plates 120 where the liquid therefore first receives treatment as by electrocoagulation. Power is applied to the plates in order to create the electric field that causes ions to be produced from the plate material for coagulation with contaminates in the liquid. Again, the U.S. Pat. No. 7,211,185 is incorporated herein for purposes of disclosure of how power can be selectively applied to the plates 120 to achieve effective electrocoagulation. The solid material or sludge produced by electrocoagulation collects within the sludge blanket at the bottom of tank as in the prior embodiment. Thus, the embodiment of FIG. 6 eliminates the need for a separate upstream electrocoagulation tank. Initial electrocoagulation occurs by the downward travel of the liquid; however it is noted that the lateral side edges of the plates are exposed within the tank so that circulation of liquid within the gap between the casing and the tank allows for additional electrocoagulation. Therefore, it is also contemplated that a relatively small pump (not shown) can be placed within this gap in order to encourage an annular or circumferential flow within the tank above the sludge blanket so that the liquid has a greater dwell time between the plates 120 by multiple passes through the plates. Ultimately, the liquid is still drawn through the sludge blanket and into the chamber within the casing as the vacuum drawn will have greater power than the small pump within the tank. Depending upon how much electrocoagulation is desired, a greater or fewer amount of plates 120 can be installed. Accordingly, the size of the tank and/or casing can also be changed to accommodate the required space for the plates.

Figure 7:
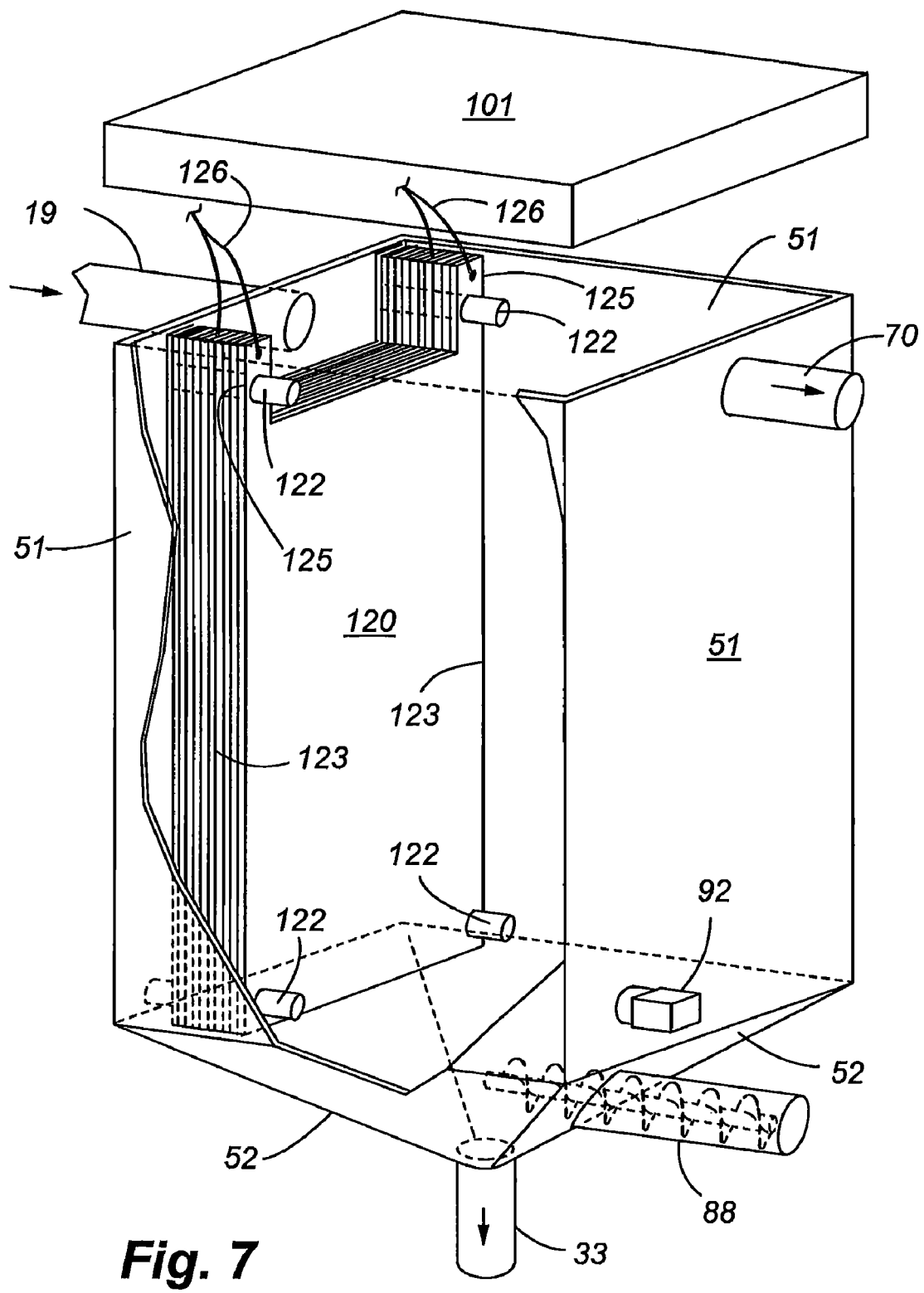
FIG. 7 is a greatly enlarged fragmentary perspective view of a tank similar to the embodiment of FIG. 6 illustrating how the reaction blades are secured within the tank having planar sidewalls.

FIG. 7 is provided to better show how the plates 120 can be secured to a sidewall of a tank and the manner in which the rods 122 are used to mount the plates. The casing, filters, and manifold have been removed in FIG. 7 to better illustrate the plates 120 and their mounted arrangement within the tank. The blades have openings to receive the rods 122. The blades are slidable over the rods and can be held in place by fasteners (not shown) secured to the free ends of the rods. The blades will degrade over time due to electrocoagulation and will require replacement. The lateral side edges 123 of the plates 120 are exposed that allows the circumferential flow of the liquid to also pass through the plates. Power can be applied by conductors 126 that attach to selected ears 125 of the plates 120. The selective connection of power to designated plates can allow a user to selectively adjust the electric field without the use of more expensive equipment such as transformers. The ears 125 are preferably above the liquid line to prevent premature breakdown of the plates at that location.

Figure 8:
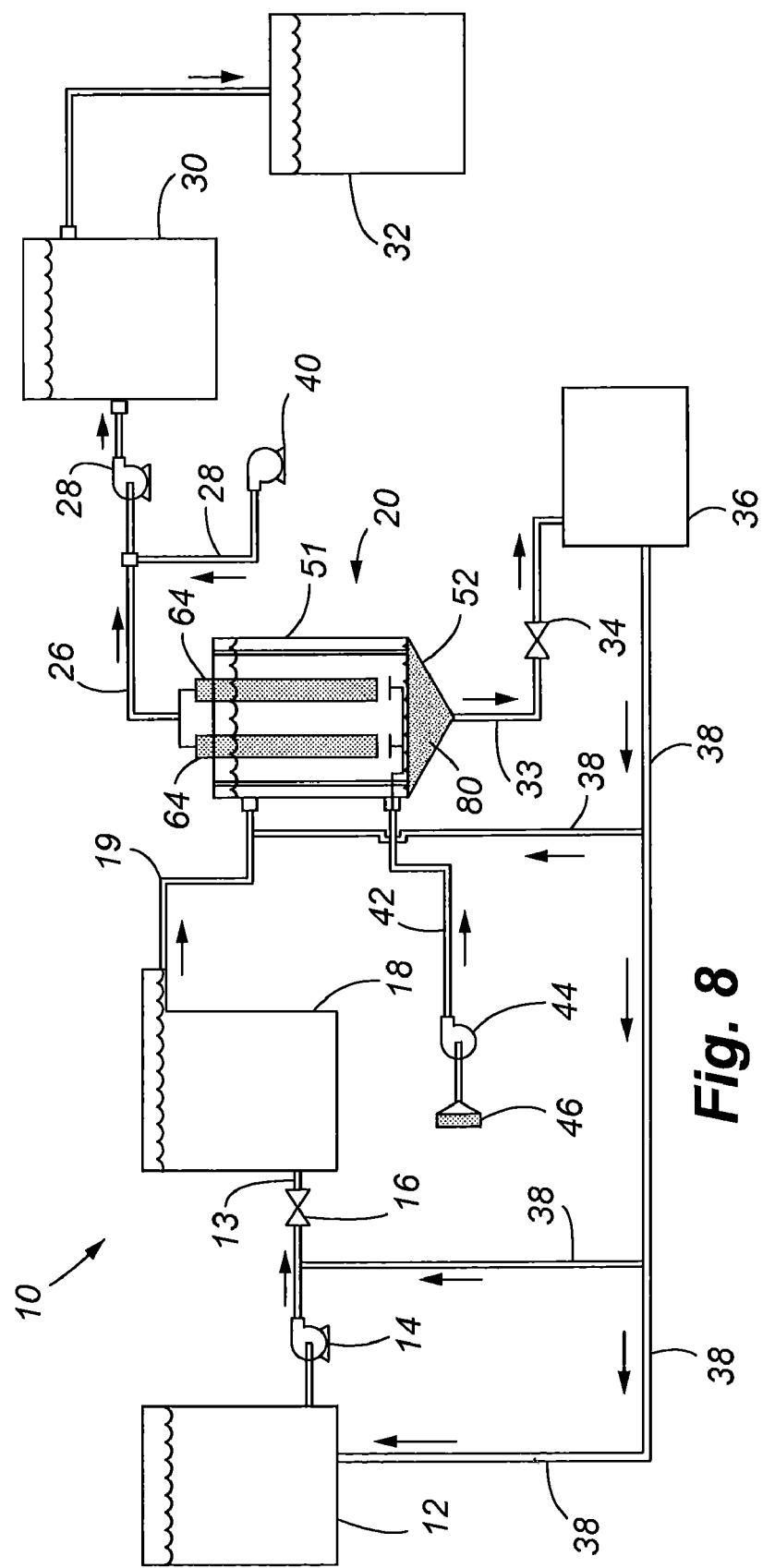
FIG. 8 is another schematic view of the method and system of the present invention in another embodiment in which a return line is provided for liquid recovered from a filter press and clarification unit located downstream from the integrated ultra-filtration and clarifier device.

Referring to FIG. 8, another embodiment of the system and method of the present invention are illustrated in which a liquid return line 38 is provided for purposes of further treatment in order to minimize the amount of liquid discharge from treatment station 36. In FIG. 1, treatment station 36 was described as being either a clarifier or filter press. In this embodiment, treatment station 36 is described more particularly as a treatment station in which liquid remaining within the sludge/solids is preferably removed first by a filter press, and then a clarifier tank receives the liquid discharged from the filter press. The liquid from the clarifier is then pumped back to one of the prior treatment or storage locations within the system. More particularly, the return line 38 is shown as extending back to any one of the prior treatment stations to include the first holding reservoir 12, and/or to the electrocoagulation unit 18, and/or to the integrated ultra-filtration and clarifier apparatus 20. Depending upon the state of the liquid recovered at station 36, this recovered liquid can be selectively transported back to the desired prior treatment location. Particularly for regulated wastewater treatment facilities in which the environmental regulations require a "zero liquid discharge" treatment, the return of the liquid from treatment station 36 eliminates the need for evaporation ponds.

Figure 9:
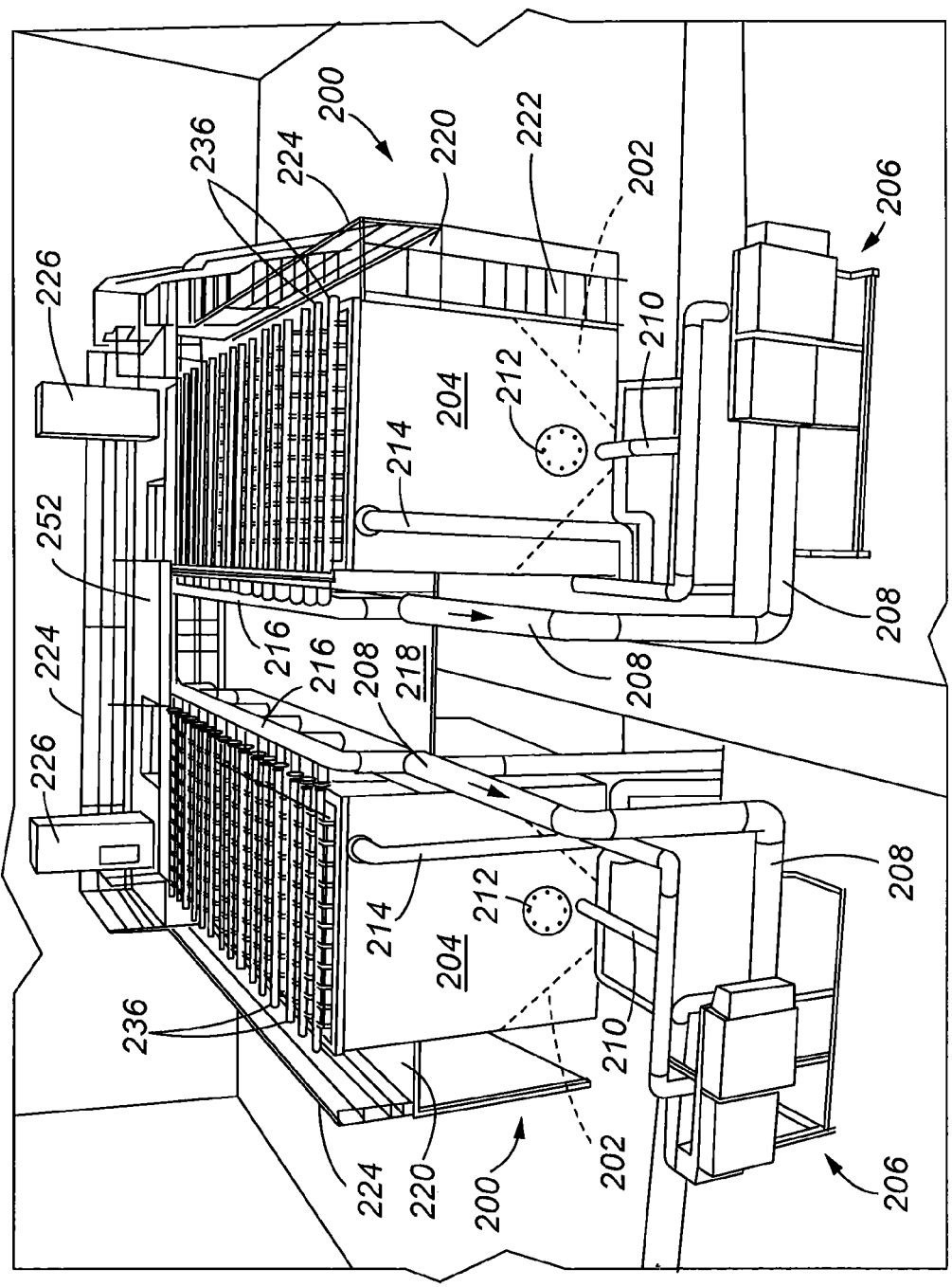
FIG. 9 is a perspective view of another embodiment of the system of the present invention illustrating a pair of side-by-side integrated ultra-filtration and clarifier devices incorporated within a treatment system.

FIG. 9 illustrates another embodiment comprising an example of a commercial embodiment of the present invention in which a pair of integrated ultra-filtration and clarifier tanks are used in conjunction with a corresponding pair of electrocoagulation devices that provide flows of liquid to the integrated tanks. More specifically in reference to FIGS. 9 and 10, a pair of side-by-side integrated ultra-filtration and clarifier tanks 200 are illustrated that receive liquid to be treated from overflow weirs 230 forming part of adjacently positioned electrocoagulation apparatuses 250 (see FIG. 13). As shown, the tanks 200 have rectangular upper portions and smaller converging V-shaped lower sidewalls 202 that facilitate the clarifying function, similar to the lower conical portion 52 of the apparatus 20 discussed in the prior embodiment of FIG. 2. The end walls 204 of the tanks 200 may be rectangular shaped as shown to help facilitate support for mounting of the apparatuses. Each of the tanks 200 also communicate with a control station 206 which may include one or more electronic controllers and pumps which control the flow rate of liquid withdrawn from the tanks. A discharge or permeate line 208 transfers permeate liquid to a downstream treatment station (not shown), such as a reverse osmosis unit (for example RO Unit 30 shown in FIG. 1). A source of vacuum (not shown) communicates with the permeate lines 208 to draw the liquid through the filters 244, as discussed further below.

Figure 11:
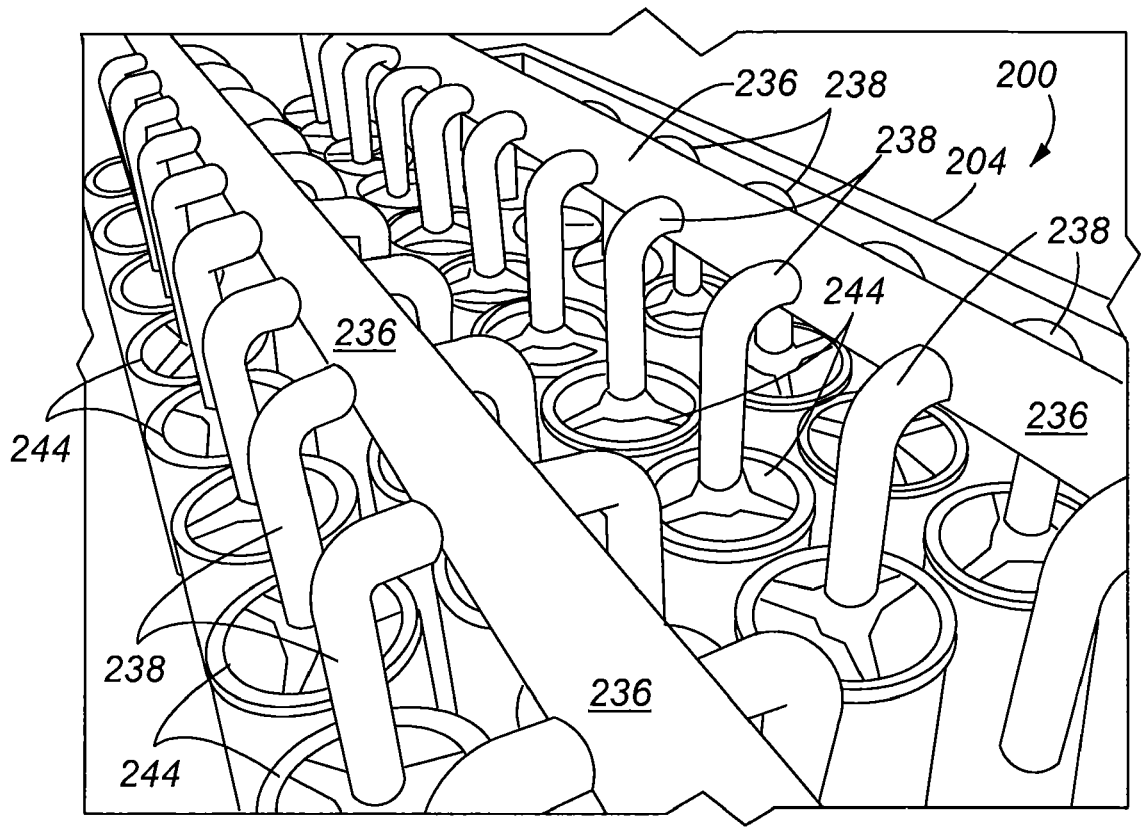
FIG. 11 is another enlarged fragmentary perspective view of the embodiment of FIG. 9 illustrating the arrangement of ultra-filtration filters located within an integrated ultra-filtration and clarifier device of FIG. 9.

As also discussed below with respect to FIG. 11, the permeate liquid is received through the header pipes 236 which flow into discharge manifolds 216 that extend along the lengths of the tanks. The discharge manifolds connect to the corresponding permeate lines 208. Solids are removed from the tanks 200 through solid discharge lines 210 which communicate with a discharge pump (not shown) to withdraw solids collected in the bottom of the tanks. As solids build up within the tanks, it may be necessary to manually remove caked solids. Accordingly, access cleaning ports 212 are provided to enable access to the lower portions of the tanks to manually remove solid build-up within the tanks.

Each of the tanks may include various safety measures to ensure the tanks do not overflow, and in FIG. 9, each of the apparatuses are provided with emergency overflow lines 214 which may receive excess liquid to prevent inadvertent overflow of the apparatuses.

An intermediate catwalk 218 and lateral catwalks 220 are provided to enable operators to conduct inspection and maintenance of the tanks, to include removing and replacing the filters. One or more access stairs 220 are provided along with safety hand rails 224.

Figure 10:
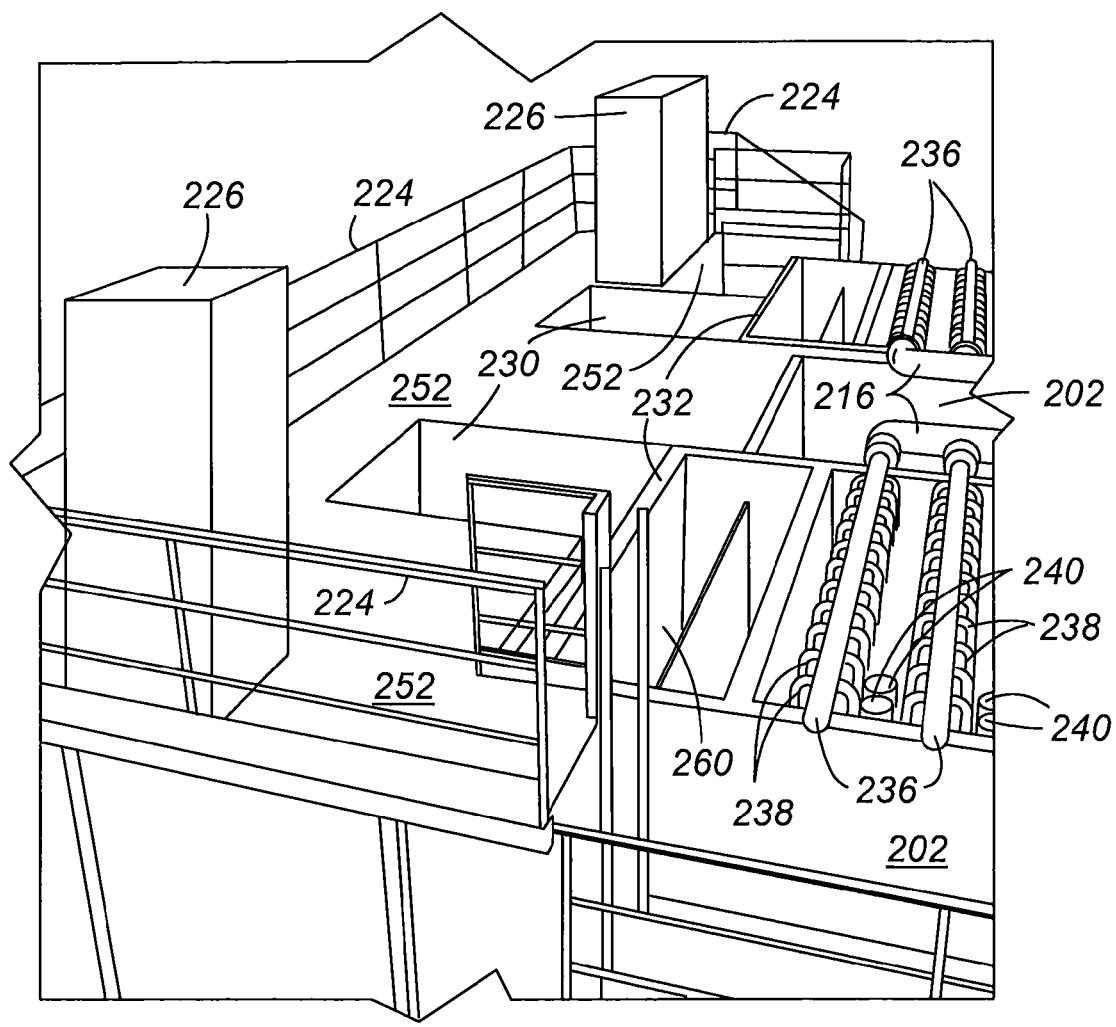
FIG. 10 is an enlarged fragmentary perspective view of the system of FIG. 9, further illustrating the interface between outlet weirs of electrocoagulation units located upstream of the integrated devices, and in which the weirs provide direct transfer of the liquids into the integrated ultra-filtration and clarifier devices.
Figure 13:
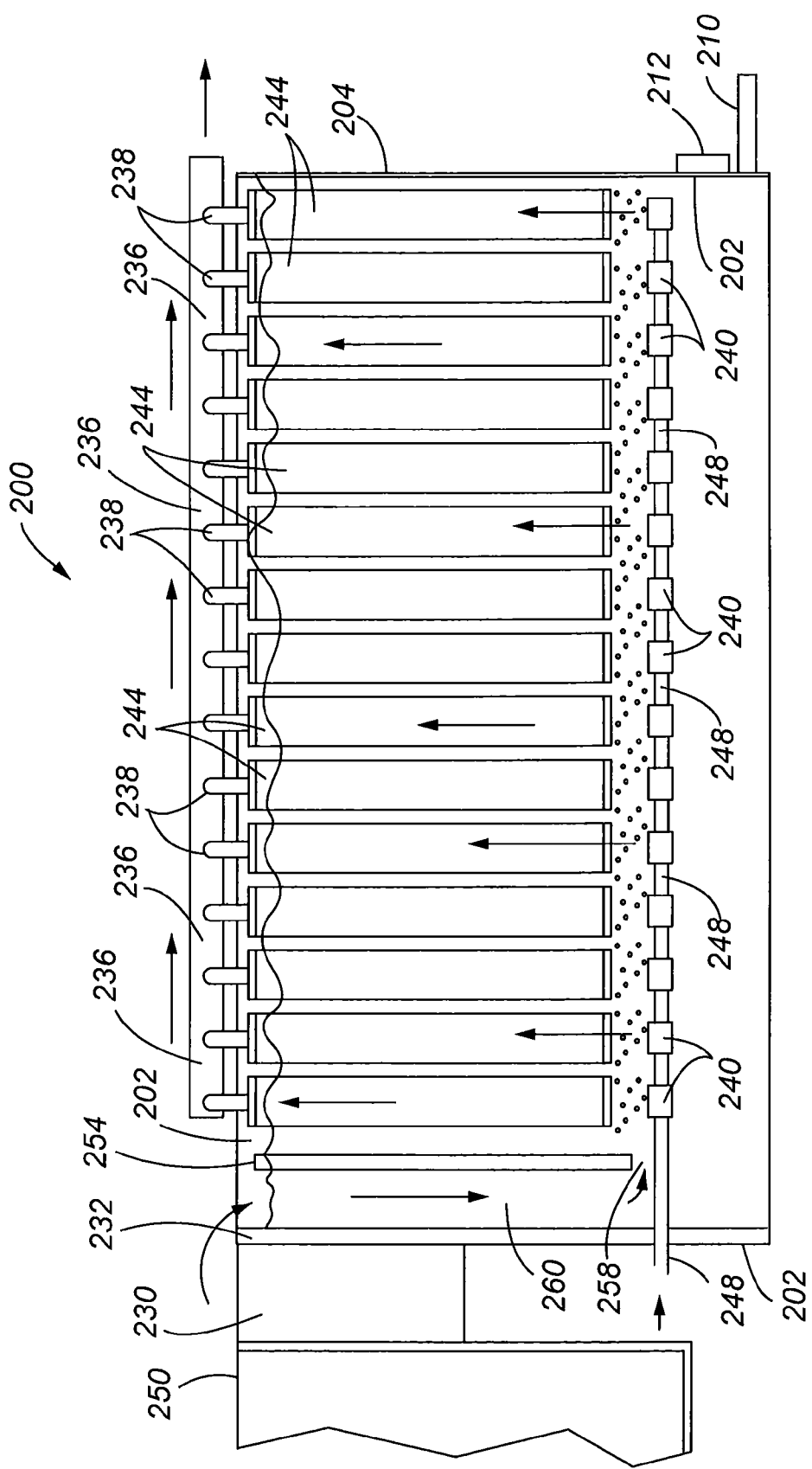
FIG. 13 is a cross-sectional view of one of the integrated devices of FIG. 9 illustrating the arrangement of the filters along with the flow path of the liquid as it is treated and withdrawn.

Referring to FIG. 10, additional power/control panels 226 are illustrated which may be used for housing necessary power and control equipment for the system. Also as shown in FIG. 10, immediately adjacent one end of each of the tanks 200 is the overflow weirs 230 from the adjacent electrocoagulation units 250 (FIG. 13). In FIGS. 10 and 11, the electrocoagulation devices 250 are hidden from view, because the devices 250 are disposed below the end platform 252. The overflow weirs 230 contain the liquid that has been treated in the electrocoagulation units. A spillway 232 enables the liquid from the corresponding weir 230 to enter into a clarifying chamber 260 (also see FIG. 13) of the tank 200. The clarifying chamber 260 encourages the initial settling of the solids within the tank.

Referring to FIG. 13, once the liquid enters the tank 200, it flows through a bottom opening 258 formed on the interior sidewall 254. The liquid is then drawn through the filters 244. Each of the filters 244 have a corresponding bubbler unit 240 that generates a stream of pressurized air that is also withdrawn through the filters 244. Air line 248 provides the compressed flow of air to each of the bubblers 240. After passing through the filters 244, the permeate liquid is first received into feed lines 238 which flow into the centrally-located header pipe 236 that extends between pairs of rows of the filters. Also referring to FIG. 11, one preferred arrangement is shown for four rows of filters 244 in which a header pipe 236 extends longitudinally between adjacent rows of filters 244.

Figure 12:
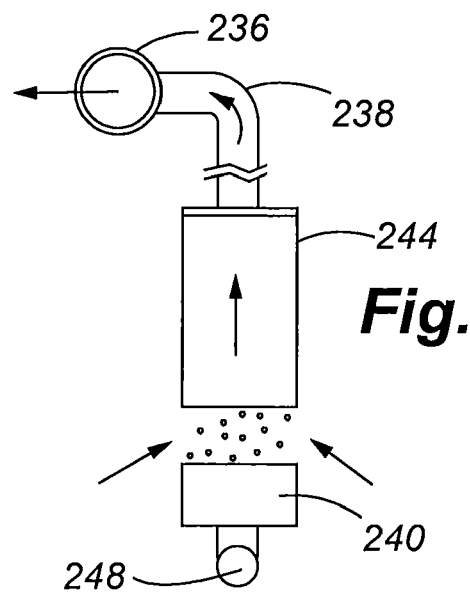
FIG. 12 is a schematic diagram illustrating the flow of liquid through the integrated device of FIG. 9.

FIG. 12 is provided to illustrate the flow of air and water in which the compressed air is provided through air line 248 into bubbler 240, and the liquid and air are then received through filters 244, through feed lines 238 which finally communicate with the header pipes 236. As best seen in FIG. 13, the bubblers 240 are disposed above the V-shaped portion of the sidewall 202 which ensures that a build-up of solids does not interfere with the bubblers.

The particular arrangement of the filters, header pipes, feed lines, and bubblers is set forth in Trisep Corporation's Spirasep™ "Ultra-filtration Membrane Technology" literature. More specifically, Trisep Corporation provides Spirasep™ ultra-filtration membrane products/systems in which a plurality of filtration membranes can be disposed as shown in the Figures of the present invention. The Spirasep™ product/ system is a back flushable, immersed, negative pressure, spiral wound ultra-filtration element. These ultra-filtration elements can be used in a wide variety of applications for removal of suspended solids. The Spirasep™ products/system is covered by the U.S. Pat. No. 6,755,970, and said patent being hereby incorporated by the reference for the disclosure of the Spirasep products/system. The purpose of the bubblers 240 is to mitigate membrane fouling. Because of the negative pressure operation of the liquid being pulled through the filters 244, this minimizes fouling of the filters and the system is able to thereby maintain very high permeate flux rates. Further, the negative pressure design of the Spirasep technologies decreases system downtime in which positive pressure filtration systems require frequent and time-consuming cleaning.

There are a number of advantages of the system illustrated in FIGS. 9-13. With the use of a pair of side-by-side ultra-filtration and clarifying apparatuses in combination with corresponding electrocoagulation units, it is possible to have continuous operations despite one apparatus and EC unit being down for maintenance and repair. Therefore, the redundant apparatuses and EC units ultimately allow non-stop continuous operations. The symmetrical side by side configured layout of the tanks provides a space savings, and the positioning of the catwalks enables operators to easily access both lateral sides of each of the tanks. The rectangular shaped upper portions of the tanks also facilitate efficient pipe runs which may be disposed in perpendicular and parallel orientations to further provide space savings. The positioning of the electrocoagulation units immediately adjacent ends of the tanks also assist in better flow control in that it is therefore not necessary to provide intermediate storage tanks and pumps to transfer liquid to be treated in the tanks.

Although supplemented treatment by addition of bacterial agents is only discussed with respect to the embodiment of FIG. 4, it shall be understood that each of the embodiments may include bacterial treatment in which a selected group of micro-organisms are introduced into the integrated apparatuses for treatment of particular contaminates.

The integrated clarification, ultra-filtration, and electrocoagulation apparatuses provide a single device for conducting two or three separate liquid treatment steps. The sludge blanket within the tank itself acts as a secondary filtration unit, minimizing the loading on the ultra-filtration filters and thereby reducing disruption of the system that occurs with required backwash cycles.

The present invention is particularly adapted for both water purification as well as treatment of wastewater. The electrocoagulation step provides an effective way in which to isolate most contaminants so they can be more effectively removed by the subsequent clarification and filtration steps. The integrated apparatuses can be operated to target contaminant removal by selectively adjusting the mass of the sludge blanket as a pre-filtration step, adjusting the type of ultra-filtration filters, and adjusting the flow rate of liquid through the apparatus by evacuation through the filters. If the apparatus includes an electrocoagulation function, a selected electric field can be created between the blades in order to target specific contaminates in the liquid.

Although the present invention has been described with respect to one or more preferred embodiments, it shall be understood that other changes and modifications can be made to the invention within the scope of the claims appended hereto.

What is claimed is:

1. A method of treating a contaminated liquid, said method comprising:
    providing a tank having an upper portion, and a smaller lower portion, said tank further having an inlet for receiving a flow of liquid and an outlet for removing liquid from the tank by vacuum force;
    providing an electrocoagulation unit upstream of said tank, said electrocoagulation unit having an overflow weir integral with said inlet of said tank to provide a flow of the liquid into said tank;
    conducting electrocoagulation in said electrocoagulation to treat the liquid
    conducting clarification and filtration in said tank to further treat the liquid;
    delivering solids recovered in said tank from a solids outlet of the tank to a downstream treatment station;
    said downstream treatment station including removing liquid from the recovered solids in a filter press and a clarifier tank; and
    conveying the liquid from the recovered solids upstream of the electrocoagulation unit and into a chamber of the electrocoagulation unit for further treatment.

2. An integrated ultra-filtration and clarifier apparatus comprising:
    a tank having a substantially rectangular upper portion and a smaller lower portion, said lower portion having a pair of converging opposing lateral sidewalls;
    an inlet spillway for receiving a flow of liquid into said tank;
    a plurality of filters disposed within an interior of said apparatus and spaced from one another therein, said filters being arranged in a plurality of longitudinal rows;
    at least one header pipe for receiving filtered liquid from said filters wherein each of said filters includes a corresponding feed line interconnecting the filter to said header pipe;
    a plurality of bubblers for providing a pressurized flow of air within said apparatus and flowing through said filters along with said liquid; and
    a solids outlet for discharge of solids from said lower portion of said tank.

3. An apparatus, as claimed in claim 2, further including:
    at least one catwalk attached to said tank to provide user access to an interior of said tank.

4. An apparatus, as claimed in claim 2, further including:
    a plurality of catwalks enabling user access to said tank at multiple locations.

5. An apparatus, as claimed in claim 2, wherein:
    said filters are suspended in said tank by said feed lines connected to said header pipe disposed above said tank.

6. An apparatus, as claimed in claim 2, further including:
    a solids access cleaning port to enable manual removal of solids building up in said lower portion of said tank.

7. A system for treatment of liquid, comprising:
    an electrocoagulation unit having an inlet for receiving a flow of liquid and an outlet for discharging liquid after the liquid has been treated by electrocoagulation within the electrocoagulation unit, said outlet comprising an overflow weir;
    a tank having a substantially rectangular upper portion and a smaller lower portion, said lower portion having a pair of converging opposing lateral sidewalls;
    an inlet spillway for receiving a flow of liquid into said tank directly from said overflow weir;

a plurality of filters disposed within an interior of said tank and spaced from one another therein, said filters being arranged in a plurality of longitudinal rows;

at least one header pipe for receiving filtered liquid from said filters wherein each of said filters includes a corresponding feed line connecting to said header pipe, said header pipe being under a vacuum force and disposed above the filters;

a plurality of bubblers for providing a pressurized flow of air within said apparatus and flowing through said filters along with said liquid; and a solids outlet for discharge of solids from said lower portion of said tank.

* * * * *

UNITED STATES PATENT AND TRADEMARK OFFICE
CERTIFICATE OF CORRECTION

| | |
|---|---|
| PATENT NO. | : 7,981,301 B2 |
| APPLICATION NO. | : 12/623270 |
| DATED | : July 19, 2011 |
| INVENTOR(S) | : Scott W. Powell |

It is certified that error appears in the above-identified patent and that said Letters Patent is hereby corrected as shown below:

In Claim 1, page 22, column 14, please replace line 12 with the following:

--conducting an electrocoagulation in said electrocoagulation unit--

Signed and Sealed this
Twenty-second Day of November, 2011

David J. Kappos
*Director of the United States Patent and Trademark Office*